UNITED STATES PATENT OFFICE.

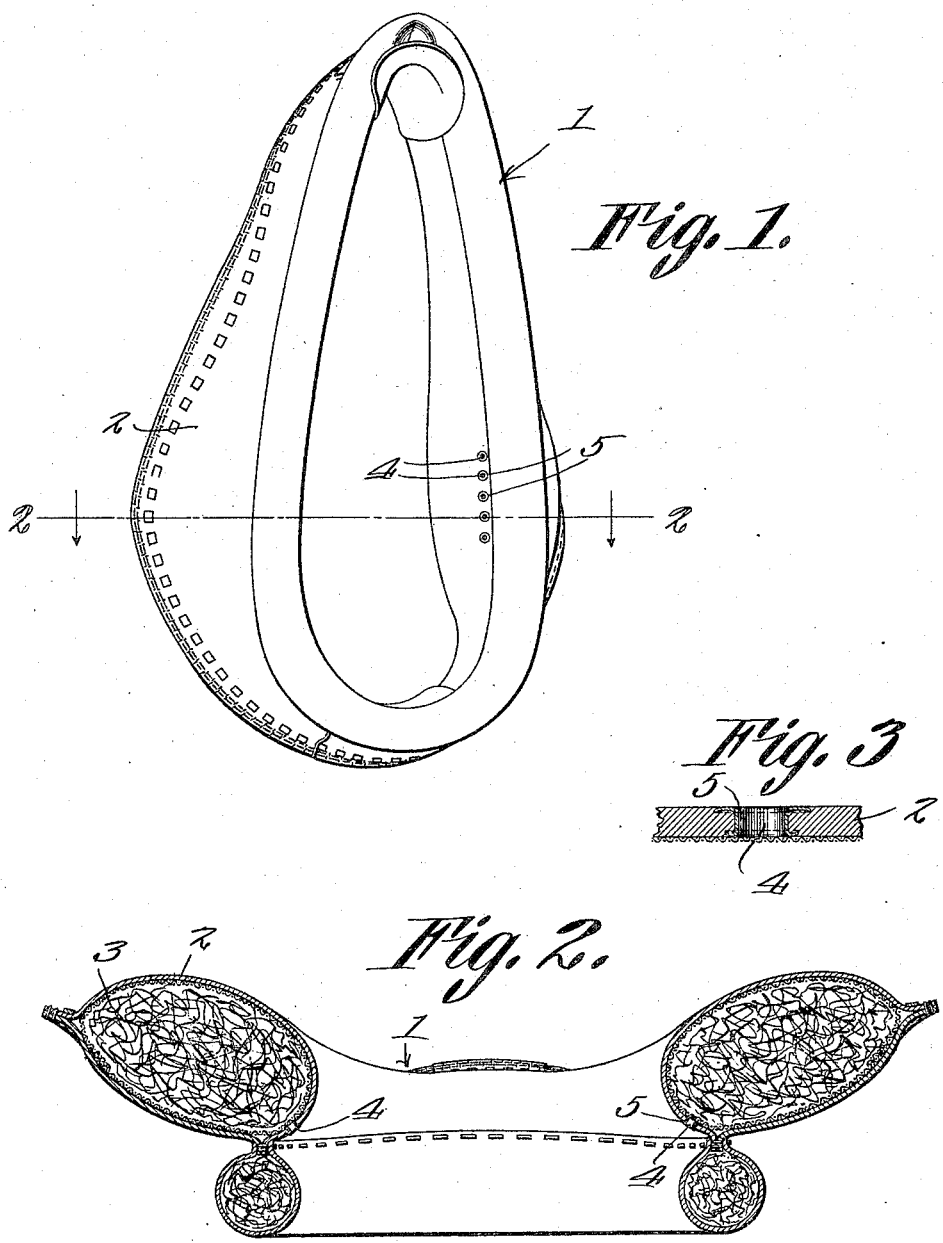

HUGH M. MITCHELL, OF EAU CLAIRE, WISCONSIN, ASSIGNOR TO SCHWAHN-SEYBERTH SADDLERY CO., OF EAU CLAIRE, WISCONSIN.

VENTILATED HORSE-COLLAR.

1,186,674.   Specification of Letters Patent.   Patented June 13, 1916.

Application filed September 11, 1914. Serial No. 861,242.

*To all whom it may concern:*

Be it known that I, HUGH M. MITCHELL, a citizen of the United States, residing at Eau Claire, in the county of Eau Claire and State of Wisconsin, have invented a new and useful Ventilated Horse-Collar, of which the following is a specification.

The present invention relates to improvements in ventilated horse collars, one object of the invention being the provision of air admitting means formed in the inner portion of the collar adjacent the neck of the horse, whereby the resiliency of the collar in combination with the pulling strain of the draft animal will cause an inhalation and exhalation of the air relatively to the inlet portion of the collar so that the collar itself will be properly ventilated and thus prevent it from becoming musty due to the absorption of the perspiration from the draft animal.

A further object of the present invention, is the provision of a ventilated collar in which a plurality of eyelets are attached to the inner face thereof without contacting or injuring the neck or shoulders of the draft animal and in such a position as to properly reinforce the ventilating apertures to permit of the proper induction and eduction of air currents while the collar is in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a perspective view looking from the forward portion of the collar. Fig. 2 is a horizontal section through the same showing the inner portion of the collar in plan. Fig. 3 is a cross section of a portion of the collar through the ventilating eyelet.

Referring to the drawings, the collar 1 is made with the outer casing 2 and with the stuffing 3, which is a resilient stuffing to permit of the proper depression and expansion of the outer casing of the collar and being substantially formed in the usual manner. Formed in the casing adjacent to the neck engaging portion of the collar are a plurality of apertures 4 which are protected by the reinforcing metal eyelets 5. These apertures 4 and eyelets 5 may be disposed at slightly different positions but are here shown at a desirable position.

It will thus be seen that when the collar is disposed upon the draft animal and the animal is pulling a vehicle, or load, that the natural pressure of the pull upon the collar will compress the resilient stuffing of the collar so that when the collar is released it will expand and cause air to be drawn into the body of the collar through the apertures 4, the compressive action due to the draft strain thereon causing the air to be expelled. By providing the ventilating openings, when the collar is at rest, the air may properly circulate therein to dry the stuffing and thus prevent the collar from becoming musty.

Where so desired, the ventilating openings may be placed upon the outside as well as the inside so a complete ventilation is had through the collar. Any number of the ventilating apertures may be provided upon the inside of the collar so as to produce draft conditions, that is the induction and expulsion of air which will assist in cooling the horse's neck.

Considered briefly, the invention resides in a horse collar embodying a resilient covering having vertical reëntrant V-shaped portions along those portions which contact with the side of the horse's neck, (clearly seen by reference to Figs. 1 and 2), a compressible stuffing in the covering, and a set of eyelets engaged through the rear wall of each V-shaped portion between the upper and lower ends of the collar, said eyelets permitting of the circulation of air into and out of the covering, and the remainder of the covering being imperforate. As seen in Fig. 2, said V-shaped portions face one another, and the eyelets 5 are in the rear walls of said portions.

What is claimed is:

A horse collar embodying a resilient covering having vertical reëntrant V-shaped portions along those portions which contact with the sides of the horse's neck, a compressible stuffing in the covering, and a set of eyelets engaged through the rear wall of each V-shaped portion between the upper and lower end of the collar, said eyelets permitting of the circulation of air into and out of the covering, the remainder of the covering being imperforate.

In testimony that I claim the foregoing as my own, I have hereto affixed my signature in the presence of two witnesses.

HUGH M. MITCHELL.

Witnesses:
W. L. SEYBERTH,
C. G. HILDAHL.